May 1, 1934.    F. SALMEN, JR    1,956,963
ONE WAY SCREW
Filed May 9, 1931
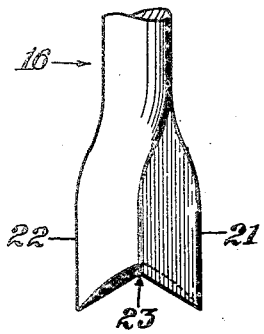
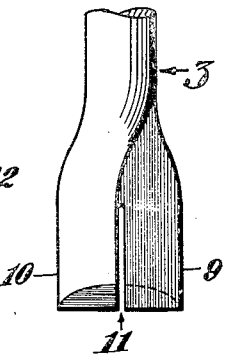
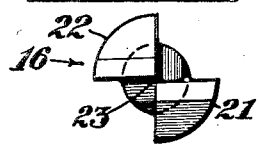
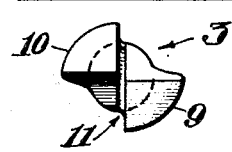
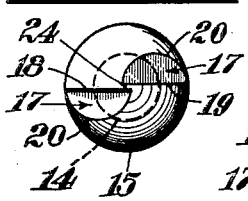
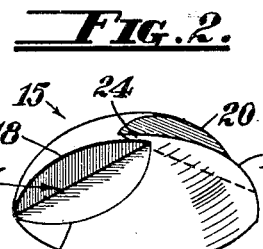
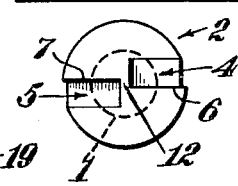
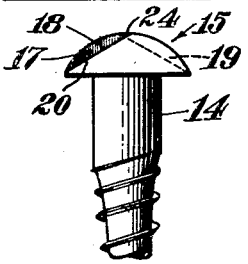
Inventor
Fred Salmen, Jr.
By
R. S. Berry
Attorney Patented May 1, 1934

1,956,963

UNITED STATES PATENT OFFICE 1,956,963

ONE WAY SCREW

Fred Salmen, Jr., Los Angeles, Calif.

Application May 9, 1931, Serial No. 536,097

2 Claims. (Cl. 85—45)

This invention relates to improvements in screws and like fastenings.

An object of the invention is to provide a self locking screw which may be readily screwed in place but cannot be unscrewed, whereby grill work and various building elements and parts and objects may be permanently held in place with such screws in a particularly efficacious manner.

Another object is to provide a one way screw of the character described through the simple expediency of forming in the screw head, shoulders which offer a tool hold only when the driving tool is turned to set or screw in the screw.

A further object is to provide a new form of screw head and driving tool therefor, both of which may be easily and inexpensively manufactured and provide for the improvements hereof in a highly satisfactory manner.

With the foregoing objects in view, together with such other objects and advantages as may subsequently appear, the invention resides in the parts and in the combination, construction and arrangement of parts hereinafter described and claimed and illustrated by way of example in the accompanying drawing in which:

Figure 1 is a fragmentary perspective view of a screw constructed in accordance with my invention;

Figure 2 is a perspective view of a modified form of the screw;

Figure 3 is a side elevation of the screw driving tool for the screw shown in Figure 1;

Figure 4 is a bottom plan view of the tool shown in Figure 3;

Figure 5 is a top plan view of the screw of Figure 1;

Figure 6 is a side elevation of the tool for driving the screw of Figure 2;

Figure 7 is a bottom plan view of the tool of Figure 6;

Figure 8 is a top plan view of the screw of Figure 2;

Figure 9 is a side elevation of the screw shown in Figures 2 and 8.

As shown in detail in the accompanying drawing a preferred form of the screw of this invention comprises the usual threaded shank 1 having a head 2 which in Figures 1 and 5 is shown flat on its outer side. In accordance with my invention I provide a formation in the outer side of the screw which offers a hold for a driving tool 3 (Figures 3 and 4) only when the latter is turned to screw in the screw, whereby the screw may be operated but one way and cannot be removed. It is now apparent that grill work, doors, closures and various building elements and parts and objects which are intended to safeguard or form a protective or burglar-proof enclosure barrier or cover may be permanently and effectively locked and held in place through the simple expediency of fastening the same with screws made in accordance with this invention.

One way of providing the screw head with the aforesaid characteristics comprises the formation in any suitable manner of two separated and independent indentations 4 and 5 in the outer flat face of the screw head, on opposite sides of the center of said head, and with each indentation opening at the periphery of said head. These indentations are formed to provide straight shoulders or abutments 6 and 7 which are parallel to the longitudinal axis of the screw but located entirely below the plane of the flat otherwise smooth outer face of the head.

Usually the ordinary groove in a screw head provides opposed shoulders between which a screw driver is engageable to rotate the screw in either direction. In the present case, however, the indentations each provide a single shoulder and the shoulders are disposed out of opposed relation, there being inclined surfaces 8 opposite the shoulders 6 and 7, said surfaces extending in a counter-clockwise direction therefrom. These surfaces offer no tool hold whatsoever. Therefore, the tool for driving the screw may be engaged with the shoulders 7 and have a tool hold thereagainst only when turned to screw in the screw, any movement to the contrary causing the tool to slip out of the indentation on said inclined surfaces 8.

The screw driving tool 3, as will be noted with reference to Figures 3 and 4 is of special formation to fit the screw head 2. It has a divided or bifurcated bit, one section 9 of which is flat on one side and beveled on the other, whereas the other section 10 is beveled and flat respectively on the sides oppositely to the section 9. The space 11 between the bit sections accommodates the web portion 12 in the screw head. It is therefore clear that the divided bit may be engaged in the depressions 4 and 5 so as to bring the flat faces of the bit sections 9 and 10 against the shoulders 6 and 7, to provide for a rotation of the screw in the direction which will screw in the screw. When the bit is thus engaged the beveled faces thereof rest on the beveled or inclined faces of the head and it is therefore apparent that if an attempt is made to rotate the tool so as to unscrew the screw, the bit will readily be forced out of the indentations in the screw head by the cam action of said beveled surfaces.

As shown in Figures 2, 8 and 9 the invention hereof is provided in a screw having the usual shank 14 and a head 15 which is round on its outer side instead of flat. This form of screw necessitates another form or driving tool 16, as shown in Figures 6 and 7.

In this form of screw the head 15 is indented or notched as at 17 on opposite sides of the center, in such manner as to form independent shoulders or tool abutting surfaces 18 and 19 and flat inclined surfaces 20, the latter extending laterally outwardly from said shoulders. The tool 16 has a divided bit formed of sections 21 and 22, and the bit is centrally concaved to fit the convex screw head. The bit sections are oppositely formed with flat and beveled faces the flat faces being adapted to engage the shoulders 18 and 19 while the beveled faces engage the surfaces 20. With this arrangement when the tool is turned to drive the screw, it obtains a hold on the shoulders 18 and 19 but when rotated to unscrew the screw the beveled sides of the bit sections 21 and 22 will readily ride off the inclined surfaces 20 without turning the screw. The space 23 between the bit sections 21 and 22 receives the point or center portion 24 of the screw and like the space 11 in the tool 3 serves to center and aid in holding the tool in place while driving the screw.

It will now be clear that the embodiments of my invention here shown and described will provide for the objects and advantages hereof in a particularly efficacious manner.

I claim:

1. In a screw, a shank, a head thereon having indentations on opposite sides of the center thereof leading inwardly from the margin of the head and defining a pair of shoulders arranged in off-set relation to each other, and a web portion separating the shoulders, the opposed faces of which extend parallel with each other and project at right angles to said shoulders, said shoulders being of uniform height throughout the lateral extent thereof.

2. In a screw, a shank, a head thereon having indentations on opposite sides of the center thereof leading inwardly from the margin of the head and defining a pair of straight shoulders arranged in off-set relation to each other, and a web portion separating the shoulders, said shoulders being of uniform height throughout the lateral extent thereof, said web portion having the opposed side faces thereof extending parallel with each other and projecting at right angles to said shoulders and which decrease in height in a direction away from said shoulders, said indentations having upwardly inclined bottom walls opposite said shoulders.

FRED SALMEN, Jr.